United States Patent [19]

Lemieux et al.

[11] Patent Number: 5,315,200
[45] Date of Patent: May 24, 1994

[54] ELECTRICAL MOTOR STATOR INSTALLATION

[75] Inventors: George E. Lemieux, Livonia; Rudolf Beim, Southfield, both of Mich.

[73] Assignee: Ford Motor Company, Dearborn, Mich.

[21] Appl. No.: 914,403

[22] Filed: Jul. 16, 1992

[51] Int. Cl.$^5$ ............................ H02K 1/12; H02K 7/08
[52] U.S. Cl. ......................................... 310/258; 310/42; 310/51; 310/91; 29/596
[58] Field of Search .................... 310/42, 91, 116, 117, 310/217, 218, 254, 258, 259, 51; 29/596

[56] References Cited

U.S. PATENT DOCUMENTS

| | | | |
|---|---|---|---|
| 2,513,227 | 6/1950 | Wylie | 310/258 |
| 2,632,861 | 3/1953 | Morton et al. | 310/258 |
| 2,973,442 | 2/1961 | Wilson | 310/258 |
| 3,108,200 | 10/1963 | Baldwin | 310/218 |
| 3,176,380 | 4/1965 | Wightman | 29/596 |
| 3,599,024 | 8/1971 | Kitamura | 310/263 |
| 4,007,867 | 2/1977 | Wielt et al. | 228/179 |
| 4,076,989 | 2/1978 | Watson | 310/89 |
| 4,134,036 | 1/1979 | Curtiss | 310/42 |
| 4,249,097 | 2/1981 | Gronholm | 310/51 |
| 4,250,423 | 2/1981 | Linscott, Jr. | 310/258 |
| 4,381,747 | 5/1983 | Kobayashi et al. | 123/339 |
| 4,564,780 | 1/1986 | Nel | 310/258 |
| 4,881,001 | 11/1989 | Patel et al. | 310/258 |
| 5,059,844 | 10/1991 | Anstine | 310/90 |

Primary Examiner—Steven L. Stephan
Assistant Examiner—D. R. Haszko
Attorney, Agent, or Firm—Roger May; Paul Godwin

[57] ABSTRACT

A wave spring is provided for securing a stator in a dynamoelectric machine. The wave spring is disposed on one end of the stator between a support chassis for the stator and the stator, and compressed thereon to secure the stator in a fixed position in the support chassis. The compressed wave spring provides sufficient force to prevent movement of the stator during operation in various environments. In a further aspect of the invention, the opposing surfaces between which the wave spring is compressed include recesses which receive portions of the wave spring. The recesses are offset, and are effective in further inhibiting rotation of the rotor inside the support chassis for the stator, and may also be used for positioning the stator therein.

20 Claims, 3 Drawing Sheets 5,315,200

ELECTRICAL MOTOR STATOR INSTALLATION

BACKGROUND OF THE INVENTION

The present invention relates to the installation of electrical motor stators, and in particular, to the use of a wave spring to secure an electrical motor stator against vibration and rotation.

In electrical motors, stators are typically assembled in a fixed position about a rotating coil. Proper positioning of the stator is important to achieve desired output and efficiency. During operation, however, stators are subjected to vibration and other forces from within and without the motor which tend to move and dislodge them. For example, motor electrical pulses induce torsional vibration in stators. The environment of use, such as in automobiles, subject motor stators to additional external vibration. Thus, secure mountings for stators have long been sought for stators to prevent vibration and rotation. More recently, stator assembly improvements have focused upon eliminating the use of fasteners, for example, to facilitate removal and replacement of stators, and reduce assembly time.

The need remains, however, for continued improvement in electrical motor stator assembly to meet the demands of current and future operating environments.

SUMMARY OF THE INVENTION

The need for continued improvement in motor stator installation is met by the present invention. In accordance therewith, a device for securing a stator in a dynamoelectric machine, such as an electric motor, is provided for such machines which include a support chassis for the stator in spaced relationship to an axis of rotor rotation and a stator positioned therein in spaced relationship around said axis. The device of the present invention includes a wave spring disposed on one end of the stator between the support chassis for the stator and the stator, and means for compressing the wave spring to secure the stator in a fixed position in the support chassis. The compressed wave spring provides sufficient axial force to prevent counter-rotational motion of the stator during operation in various environments. Further, the wave spring cushions the stator to prevent vibration thereof. In the preferred embodiment, the support chassis for the stator includes a first and second cover, and a housing attached to the second cover. The means for compressing the wave spring preferably includes at least one fastener which connects the housing to the first cover to maintain the wave spring in compression, securing the stator. The stator may be completely enclosed by the housing and covers, if desired for weather protection, but at any rate is maintained therein in a fixed, spaced relationship around the axis of rotor rotation.

In a further aspect of the invention, the opposing surfaces between which the wave spring is compressed include recesses which receive portions of the wave spring. The recesses are offset, and are effective in further inhibiting rotation of the rotor inside the support chassis for the stator, and may also be used for positioning the stator therein.

The present invention may be used in large and small dynamoelectric machines, and use in electric motors as large as 75 horsepower (HP) and more is contemplated.

DETAILED DESCRIPTION OF THE PREFERRED EMBODIMENTS

Figure 1:
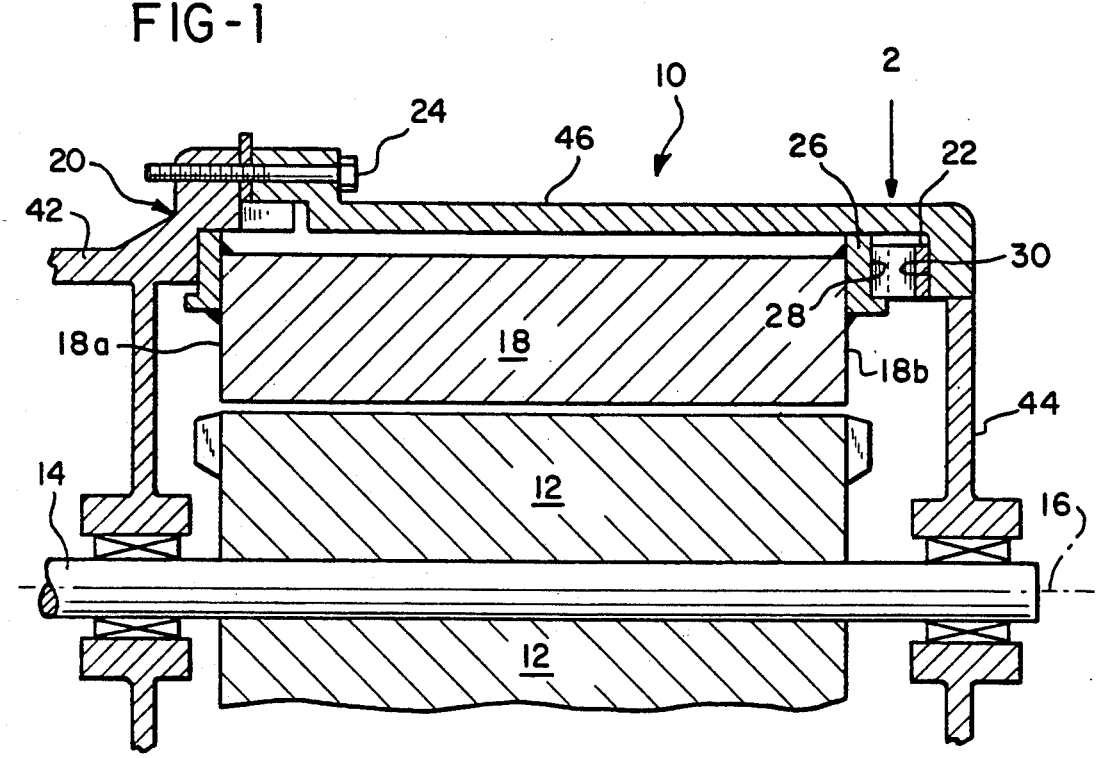
FIG. 1 is a schematic cross-sectional view of an electric motor having a stator installed in accordance with an embodiment of the present invention.

In FIG. 1, the top half of electric motor 10 is shown, the bottom half being a mirror image thereof. Electric motor 10 includes rotor 12 mounted on an axle 14 for rotation about axis 16 of rotor rotation. A stator 18 and support chassis 20 therefor, are mounted in spaced relationship around axis 16.

The support chassis 20 includes a first cover 42, a housing 46, and a second cover 44. Housing 46 is connected to the second cover 44 and extends between the first and second covers 42, 44, to provide protection from the environment. Alternatively, the housing 46 could be connected to the first cover 42. It is necessary only that support chassis 20 provide surfaces 30 and 40 which may be used to position the stator 18 in spaced relationship around the axis 16, and that at least one of the surfaces be used to compress a wave spring 22 against an end of the stator 18.

The stator 18 is secured in position with a device including a wave spring 22, disposed between the end 18b of the stator 18 and the support chassis 20 for the stator, and fastener 24 for compressing the wave spring 22 therebetween. The spring force in the wave spring 22 is sufficient to provide even pressure on the end 18b of the stator 18 so that the stator 18 is frictionally engaged with sufficient force at both ends 18a, 18b to remain securely positioned.

Figures 2, 3:
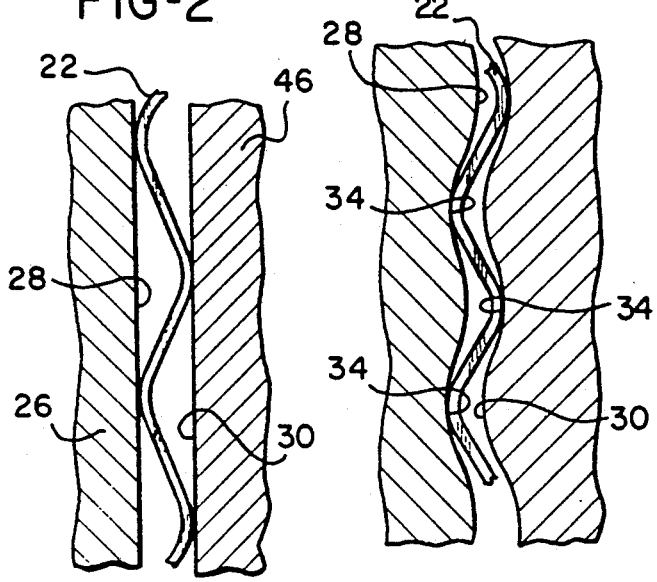
FIG. 2 is a detailed top view of the electric motor of FIG. 1 taken along direction 2 looking downward towards the centerline.
FIGS. 3 and 4 are detailed top views of the electric motor of FIG. 1 taken along direction 2, showing alternative embodiments of the present invention.
Figure 4:
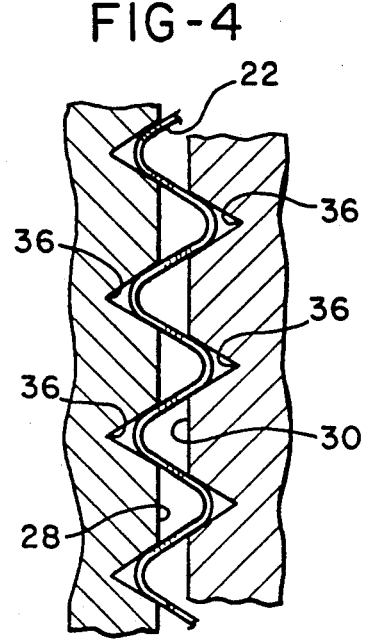
Figure 6:
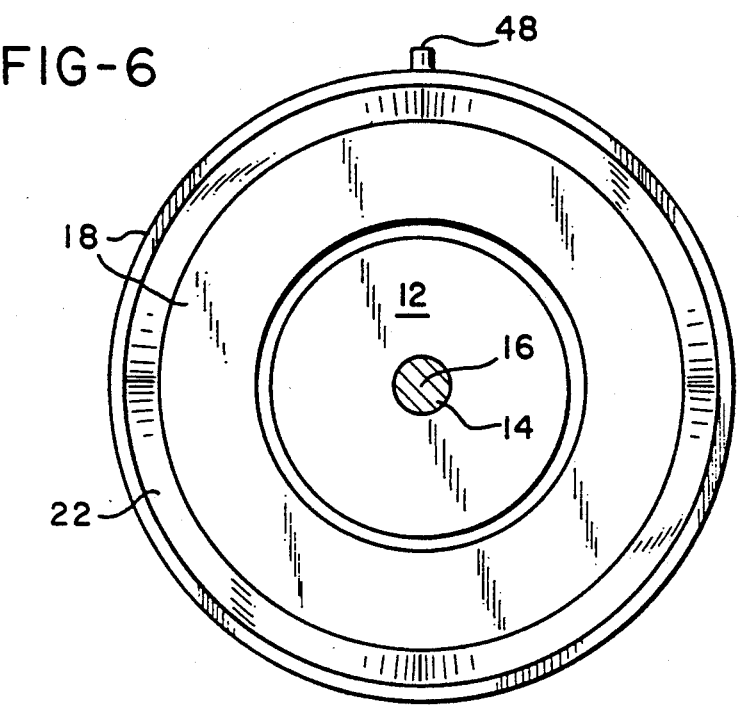
FIG. 6 is a schematic cross-sectional view of the electric motor stator and rotor of FIG. 5 taken along line 6—6.

The wave spring 22 of the present invention preferably has a continuous, circular shape, including waves, and is shown in cross-section in FIGS. 2-4 and 6. FIGS. 2-4 are top views of the wave spring 22 from plane 2, which extends normal to the paper, while FIG. 6 is a plan view of a continuous wave spring 22. Alternatively, the wave spring 22 may be slotted to allow for some expansion, or may comprise a plurality of segments positioned in a generally circular pattern around the axis 16. Where provided in a plurality of segments, the retainer 26 shown in FIG. 1 may be configured in a U-shape to assist in maintaining the segments of wave spring 22 in position during assembly. Preferably the wave spring 22 is made of spring steel, and the preferred shape may be produced by stamping a blank from a sheet of such steel and forming the waves therein, in a manner known in the art.

Referring now to FIG. 2, it is preferred that the wave spring 22 be positioned between a surface 28 at the end 18b of the stator 18 and a surface 30 of the housing which are both substantially planar, and in opposing, generally parallel relationship with respect to each other. The surfaces 28 and 30 are, further, preferably perpendicular to the axis 16, and as shown in FIG. 1, extend normal to the paper.

FIG. 3 shows an alternative embodiment of the present invention wherein the surfaces 28 and 30 in opposing relationship include a plurality of recesses 34 to respectively receive alternate waves of the wave spring 22. As shown in cross-section, the recesses 34 are a series of arcuate indentations in sinusoidal relationship which extend along the surfaces 28 and 30 in a generally circular direction.

FIG. 4, shows another alternative embodiment of the present invention wherein the surfaces 28 and 30 are in opposing relationship. The surfaces 28 and 30 include a plurality of offset recesses 36 which comprise a series of spaced notches positioned in a generally circular pattern to respectively receive alternate waves of the wave spring 22.

Although recesses 34 and 36 are shown in FIGS. 3 and 4 in both surfaces 28 and 30, as is preferred in the alternative embodiments, recesses may also be provided in just one of the surfaces 28 or 30. The recesses 34 and 36 allow the spring 22 to compress in accordance with the present invention. Further, the recesses 34 and 36 provide further frictional resistance to secure the stator 18 against rotation, reducing the axial force that is required to maintain the position of the stator 18. With less axial force required, the wave spring 22 can be made of thinner material, and the forces on fastener 24 are reduced, reducing the cost and effort required for assembly. The recesses 34 and 36 can also be used to locate the position of the stator 18, and provide a means for indexing the stator position, as more fully discussed below.

Figure 5:
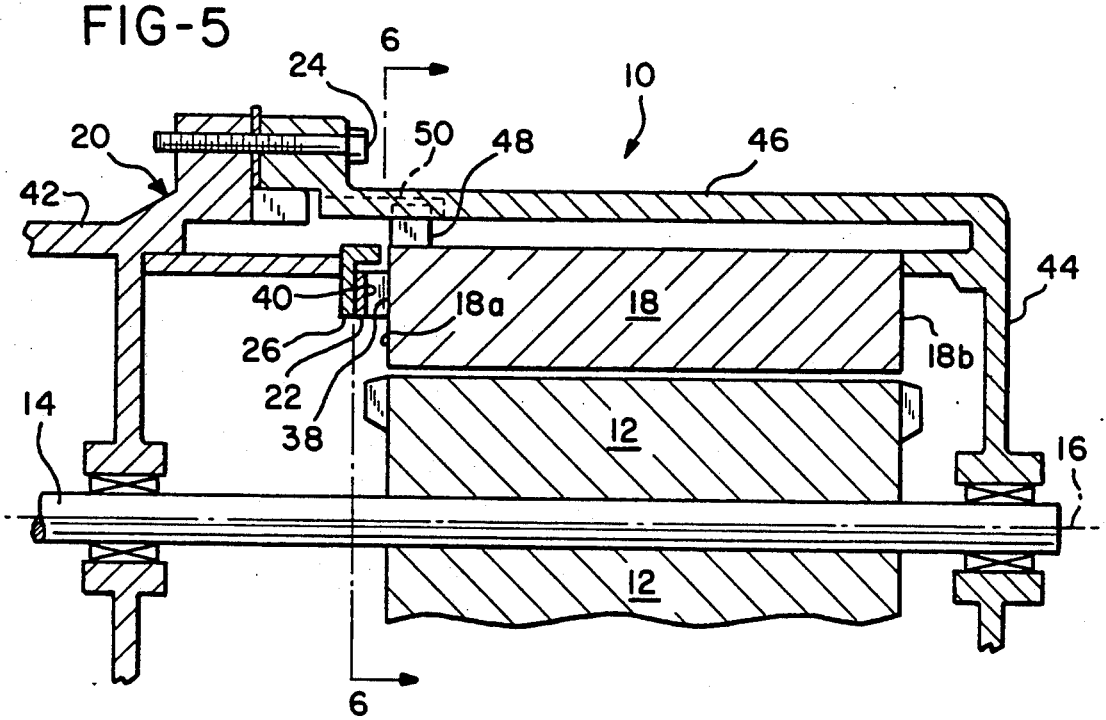
FIG. 5 is a schematic cross-sectional view of an electric motor having a stator installed in accordance with the preferred embodiment of the present invention.

In FIG. 5, the preferred embodiment of the present invention is shown schematically including a wave spring 22. The wave spring 22 is positioned between surface 38 at the end 18a of the stator 18, and a surface 40 of the support chassis 20. The wave spring 22 and surfaces 38 and 40 may be arranged in accordance with the embodiments of FIGS. 2–4 in like manner to surfaces 28 and 30. It is understood in accordance with the present invention that wave springs 22 may be employed at both ends of the stator 18 in positions such as shown in FIGS. 1 and 5. Where two wave springs 22 are so used, increased isolation of stator 18 from vibration results. However, there is less accurate control over the position of stator 18. Thus, it is preferred to use one wave spring 22.

FIG. 6 is a plan view of the wave spring 22 installed on stator 18 in accordance with the embodiments of both FIGS. 1 and 5. The wave spring 22 is shaded to indicate, representatively, that four troughs and four peaks of waves are formed therein.

The means for compressing the wave spring 22 of the present invention is a fastener 24 which interconnects the first and second covers 42 and 44. Any conventional fastener 24 may be used, for example, at least one bolt, as shown in the FIGS. 1 and 5, a clamp, and/or a lever. In FIG. 5 the fastener 24 connects the first cover 42 to the housing 46 to maintain wave spring 22 in compression against end 18a of the stator 18. Preferably, the means for compressing the wave spring 22, fastener 24, provides compression in a direction generally parallel to the axis 16.

In assembling the wave spring 22 in a dynamoelectric machine, it is preferred to use clamping means to provide initial, even compression, and to facilitate insertion of fasteners 24 with constant applied force to maintain even pressure on the wave spring 22. Regardless of how assembled, the pressure force which is applied by the wave spring 22 will vary with the particular application.

Further, in assembling the present invention, it is preferred to use a means for indexing the stator position. In FIG. 5 such means are representatively shown as a key 48 on stator 18 which extends into a keyway 50 in housing 46. The key 48 and keyway 50 also provide back-up support to prevent counter-rotational motion of the stator 18, but it is understood that they function to provide indexing of the stator 18, and primary support for the stator 18 is provided by the wave spring 22.

Figure 7:
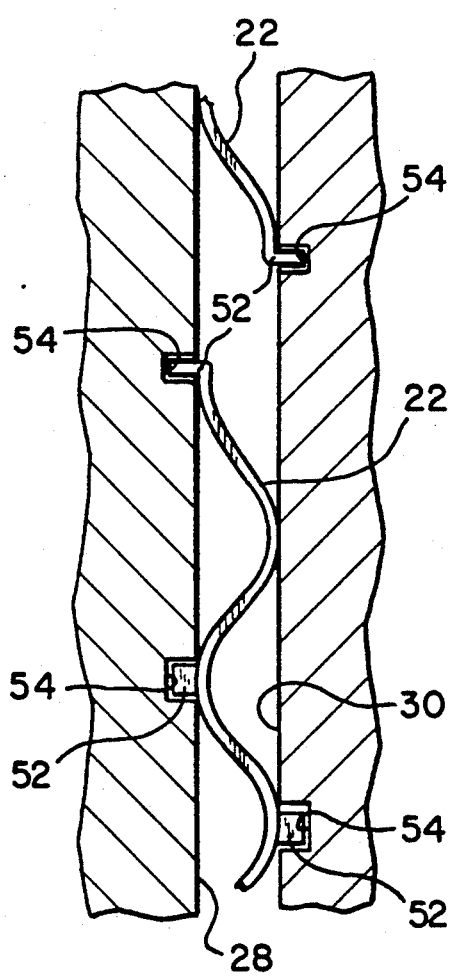
FIGS. 7 and 8 are detailed top views of the electric motor of FIG. 1 taken along direction 2, showing alternative embodiments of the present invention.
Figure 8:
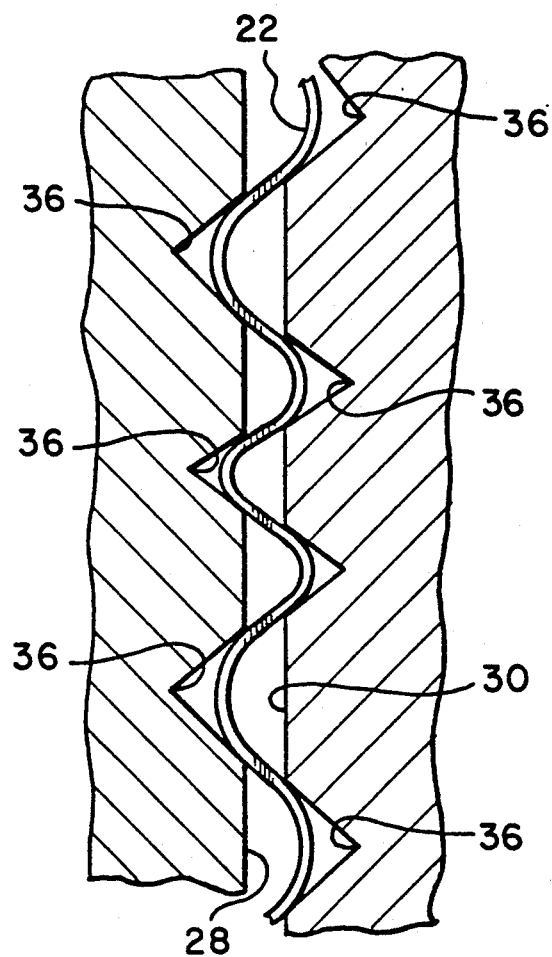

In a further aspect of the present invention, the wave spring 22 may further serve to provide a means for indexing the stator position 18, eliminating the key 48 and keyway 50, or simply facilitating proper positioning of the wave spring 22 for assembly. In FIG. 7 means for indexing includes at least one tab 52 provided on wave spring 22 with a corresponding slot 54 in one or both surfaces 28 or 30. Where a slotted wave spring 22 is used, one or both ends of the wave spring 22 may be bent to form tab 52. The tab 52 preferably extends in a direction generally parallel to the axis of rotor rotation. Representatively shown in FIG. 8, in the alternative embodiments of FIGS. 3 and 4, indexing and proper assembly could, alternatively, or additionally, be ensured by providing at least one unequally spaced wave in the wave spring 22, and corresponding unequally spaced recesses in the surfaces 28 and 30.

While certain representative embodiments and details have been shown for purposes of illustrating the invention, it will be apparent to those skilled in the art that various changes in the device disclosed herein may be made without departing from the scope of the invention, which is defined in the appended claims.

What is claimed is:

1. A device for securing a stator in a dynamoelectric machine, wherein said dynamoelectric machine includes a support chassis for the stator in spaced relationship to an axis of rotor rotation and said stator positioned in said support chassis in spaced relationship around said axis, said device comprising:
   at least one wave spring disposed on at least one end of said stator between said support chassis for the stator and said stator; and
   means for compressing said wave spring between said support chassis for the stator and said stator;
   whereby said stator is secured in a fixed position in said support chassis for the stator.

2. The device of claim 1 wherein said wave spring is a continuous, circular wave spring.

3. The device of claim 1 wherein said wave spring is a slotted circular wave spring.

4. The device of claim 1 wherein said wave spring comprises a segmented wave spring positioned in a generally circular pattern around said axis.

5. The device of claim 1 wherein said support chassis for the stator and said at least one end of said stator each have substantially planar surfaces which are in opposing, generally parallel relationship, and said wave spring is disposed between said planar surfaces.

6. A device for securing a stator in a dynamoelectric machine, wherein said dynamoelectric machine includes a support chassis for the stator in spaced relationship to an axis of rotor rotation and said stator positioned in said support chassis in spaced relationship around said axis, said support chassis for the stator and said at least one end of said stator have surfaces which are in opposing relationship and at least one of said surfaces includes a plurality of recesses, said device comprising:

at least one wave spring disposed on at least one end of said stator between said surfaces with portions of said wave spring received in said plurality of recesses; and means for compressing said wave spring between said support chassis for the stator and said stator;

whereby said stator is secured in a fixed position in said support chassis for the stator.

7. The device of claim 6 wherein said plurality of recesses comprise a series of arcuate indentations in sinusoidal relationship extending in a generally circular direction.

8. The device of claim 7 wherein each of said surfaces in opposing relationship include a series of arcuate indentations, and said series of arcuate indentations on said surfaces in opposing relationship are in offset, generally parallel relationship.

9. The device of claim 6 wherein said plurality of recesses comprise a series of spaced notches positioned in a generally circular pattern.

10. The device of claim 9 wherein said surfaces in opposing relationship are in substantially parallel relationship, each of said surfaces in opposing relationship include a series of spaced notches, and said series of spaced notches on said surfaces in opposing relationship are in offset relationship.

11. The device of claim 6 wherein each of said surfaces in opposing relationship include said plurality of recesses, and said recesses on said surfaces in opposing relationship are in offset relationship.

12. The device of claim 1 wherein said means for compressing said wave spring compresses said wave spring in a direction generally parallel to said axis.

13. The device of claim 1 wherein:

said support chassis for the stator comprises a first and a second cover; and said means for compressing said wave spring compresses said at least one wave spring between at least one of said first and second covers and said at least one end of said stator.

14. The device of claim 13 wherein said means for compressing said wave spring comprises at least one fastener connecting said first cover to said second cover.

15. The device of claim 13 wherein:

said support chassis for the stator further includes a housing connected to said second cover, said housing extending between said first and second covers; and said means for compressing said wave spring comprises at least one fastener connecting said housing to said first cover.

16. A device for securing a stator in a dynamoelectric machine, wherein said dynamoelectric machine includes a support chassis for the stator in spaced relationship to an axis of rotor rotation and said stator positioned in said support chassis in spaced relationship around said axis, said device comprising:

at least one wave spring disposed on at least one end of said stator between said support chassis for the stator and said stator;

means for compressing said wave spring between said support chassis for the stator and said stator; and means for indexing the position of said stator;

whereby said stator is secured in a fixed position in said support chassis for the stator.

17. The device of claim 16 wherein said means for indexing comprises at least one tab extending from said wave spring in a direction generally parallel to said axis, and at least one slot to receive said tab in at least one of said support chassis and said stator.

18. The device of claim wherein:

said support chassis for the stator and said at least one end of said stator have surfaces which are in opposing relationship, and at least one of said surfaces includes a plurality of recesses to receive portions of said wave spring;

said wave spring is disposed between said surfaces with portions of said wave spring received in said plurality of recesses; and said means for indexing comprises at least one unequally spaced wave in said wave spring, and correspondingly spaced ones of said plurality of recesses.

19. A device for securing a stator in a dynamoelectric machine, wherein:

said dynamoelectric machine includes a support chassis for the stator in spaced relationship to an axis of rotor rotation and said stator positioned in said support chassis in spaced relationship around said axis, wherein said support chassis for the stator and at least one end of said stator each have surfaces which are in opposing, generally parallel relationship; and said device comprises:

at least one wave spring disposed on at least one end of said stator between said surfaces of said support chassis for the stator and said stator; and means for compressing said wave spring between said surfaces of said support chassis for the stator and said stator; and wherein each of said surfaces in opposing, generally parallel relationship includes a plurality of recesses in offset relationship to receive portions of said wave spring, such that said wave spring is disposed between said surfaces with portions of said wave spring received in said plurality of recesses;

whereby said wave spring is compressed and said stator is secured in a fixed position in said support chassis for the stator.

20. A device for securing a stator in a dynamoelectric machine, wherein:

said dynamoelectric machine includes a support chassis for the stator in spaced relationship to an axis of rotor rotation and said stator positioned in said support chassis in spaced relationship around said axis, wherein said support chassis for the stator and at least one end of said stator each have surfaces which are in opposing, generally parallel relationship; and said device comprises:

at least one wave spring disposed on at least one end of said stator between said surfaces of said support chassis for the stator and said stator; and means for compressing said wave spring between said support chassis for the stator and said stator in a direction generally parallel to said axis;

whereby said stator is secured in fixed position in said support chassis for the stator.

* * * * *